(12) United States Patent
Nakazawa

(10) Patent No.: US 8,791,612 B2
(45) Date of Patent: Jul. 29, 2014

(54) ELECTRIC MOTOR HAVING AIR PURGE FUNCTION

(71) Applicant: Fanuc Corporation, Yamanashi (JP)

(72) Inventor: Yasuyuki Nakazawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/845,737

(22) Filed: Mar. 18, 2013

(65) Prior Publication Data

US 2013/0300230 A1 Nov. 14, 2013

(30) Foreign Application Priority Data

May 9, 2012 (JP) ................. 2012-107409

(51) Int. Cl.
*H02K 5/16* (2006.01)
(52) U.S. Cl.
USPC ............................................................ 310/90
(58) Field of Classification Search
USPC .................... 310/55–58, 60 R, 61–63, 90
See application file for complete search history.

(56) References Cited

U.S. PATENT DOCUMENTS

| | | | | |
|---|---|---|---|---|
| 3,679,277 | A * | 7/1972 | Dohmen | 384/480 |
| 4,961,016 | A * | 10/1990 | Peng et al. | 310/62 |
| 6,172,436 | B1 * | 1/2001 | Subler et al. | 310/90 |
| 7,459,817 | B2 * | 12/2008 | VanLuik et al. | 310/89 |

FOREIGN PATENT DOCUMENTS

| | | |
|---|---|---|
| JP | 01-133538 A | 5/1989 |
| JP | 7-299691 A | 11/1995 |
| JP | 2000-018395 A | 1/2000 |
| JP | 2004-028164 A | 1/2004 |
| JP | 2007-105850 A | 4/2007 |
| JP | 2007-237081 A | 9/2007 |

OTHER PUBLICATIONS

Corresponding JP 2012-107409 Decision to Grant dated Jun. 18, 2013.

* cited by examiner

*Primary Examiner* — Dang Le
(74) *Attorney, Agent, or Firm* — Lowe Hauptman & Ham, LLP

(57) ABSTRACT

An electric motor including a housing; an output shaft stuck out from an end face of the housing; an air purge device having an inner circumferential surface and a mounting surface, the inner circumferential surface surrounding an outer circumferential surface of the output shaft, the mounting surface is mounted on the end face of the housing, the air purge device being configured to supply air to a clearance between the inner circumferential surface and the outer circumferential surface of the output shaft; and a fastening part fastening the air purge device to the end face of the housing in a detachable manner. The housing and the air purge device respectively having fitting parts at which the housing and the air purge device are fitted to each other when mounting the air purge device to the end face of the housing.

10 Claims, 7 Drawing Sheets

FRONT ← → REAR

ELECTRIC MOTOR HAVING AIR PURGE FUNCTION

RELATED APPLICATIONS

The present application is based on, and claims priority from, Japanese Application Number 2012-107409, filed May, 9, 2012, the disclosure of which is hereby incorporated by reference herein in its entirety.

BACKGROUND OF THE INVENTION

1. Field of the Invention

The present invention relates to an electric motor which has an air purge function for preventing entry of foreign matter to the inside of the housing.

2. Description of the Related Art

As this type of electric motor, a spindle motor of a machine tool, in which compressed air is supplies to the inside of a housing from the outside through a tube and the air is discharged from a clearance between the output shaft and the housing is known. This device is described in Japanese Patent Publication (kokai) No. 2007-105850 (JP2007-105850A). However, the spindle motor described in JP2007-105850A requires formation of a flow path of compressed air in the housing, so the housing becomes complicated in structure.

On the other hand, a device is known, in which an air cap is attached at a boundary surface of a spindle and a headstock of a machine tool (an end face of headstock). This device is described in Japanese Patent Publication (kokai) No. 7-299691 (JP7-299691A). In the device described in JP7-299691A, compressed air is supplied to the inside of the air cap and the compressed air inside of the air cap is ejected from the clearance between the air cap and the spindle to the outside of the headstock.

However, in the device described in JP7-299691A, the air cap is attached in a fixed manner to the end face of the headstock, so it is difficult to change the specifications of the device to specifications tailored to situations where no air purge function is required.

SUMMARY OF THE INVENTION

According to an aspect of the present invention, the electric motor includes a housing; an output shaft stuck out from an end face of the housing; an air purge device having an inner circumferential surface and a mounting surface, the inner circumferential surface surrounding an outer circumferential surface of the output shaft, the mounting surface is mounted on the end face of the housing, the air purge device being configured to supply air to a clearance between the inner circumferential surface and the outer circumferential surface of the output shaft; and a fastening part fastening the air purge device to the end face of the housing in a detachable manner, wherein the housing and the air purge device respectively having fitting parts at which the housing and the air purge device are fitted to each other when mounting the air purge device to the end face of the housing.

BRIEF DESCRIPTION OF THE DRAWINGS

The objects, features, and advantages of the present invention will become clearer from the following description of the preferred embodiments given in relation to the attached drawings, in which.

DETAILED DESCRIPTION

Figure 1:
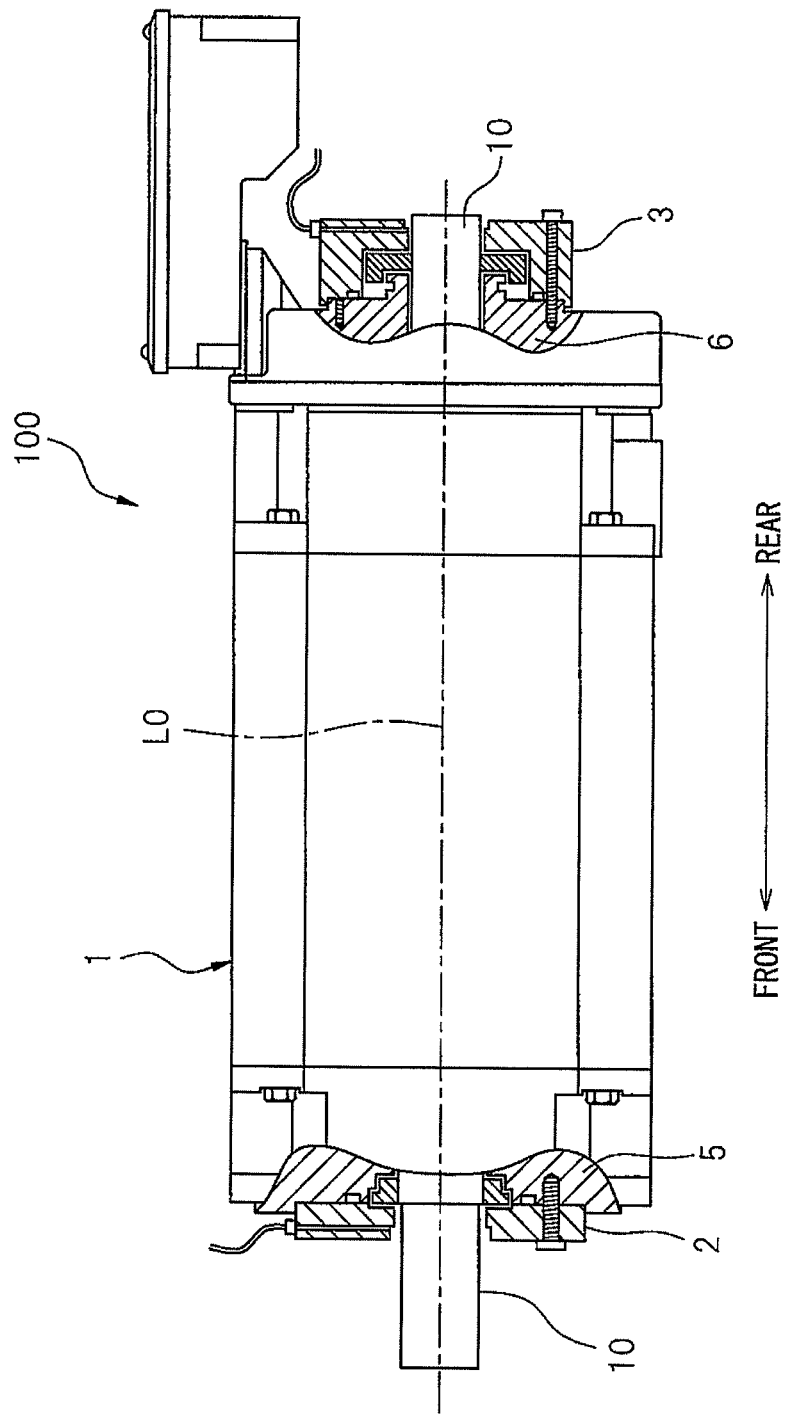
FIG. 1 is a side view which shows an overall configuration of an electric motor according to an embodiment of the present invention (partial cross-sectional view)

Below, referring to FIG. 1 to FIG. 10, an embodiment of the present invention will be explained. FIG. 1 is a side view which shows an overall configuration of an electric motor 100 according to the present embodiment (partial cross-sectional view). Below, for convenience, as shown in the figure, the front and rear directions of the electric motor 100 are defined and these definitions are followed to explain the configuration of the parts. The front and rear directions are parallel with the direction of an axial line L0 which extends along the center of the output shaft 10. The electric motor 100 is, for example, a three-phase induction electric motor which is used for driving a spindle of a machine tool such as a machining center.

As shown in FIG. 1, the electric motor 100 has an electric motor body 1 and air purge devices 2, 3 which are attached to the front side and rear side of the electric motor body 1. First, the configuration of the electric motor body 1 will be explained.

Figure 2:
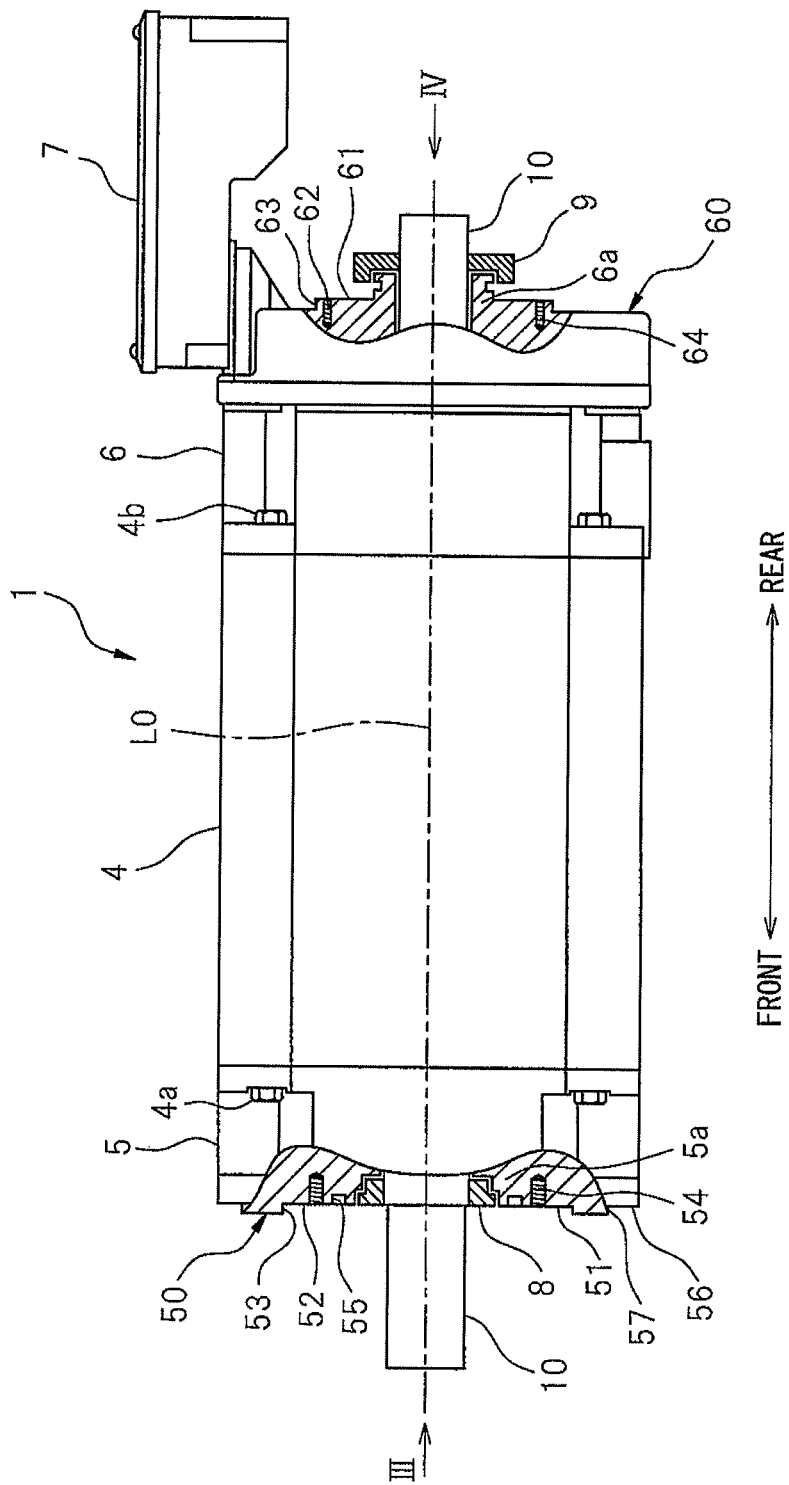
FIG. 2 is a side view which shows a configuration of an electric motor body of FIG. 1 (partial cross-sectional view)
Figure 3:
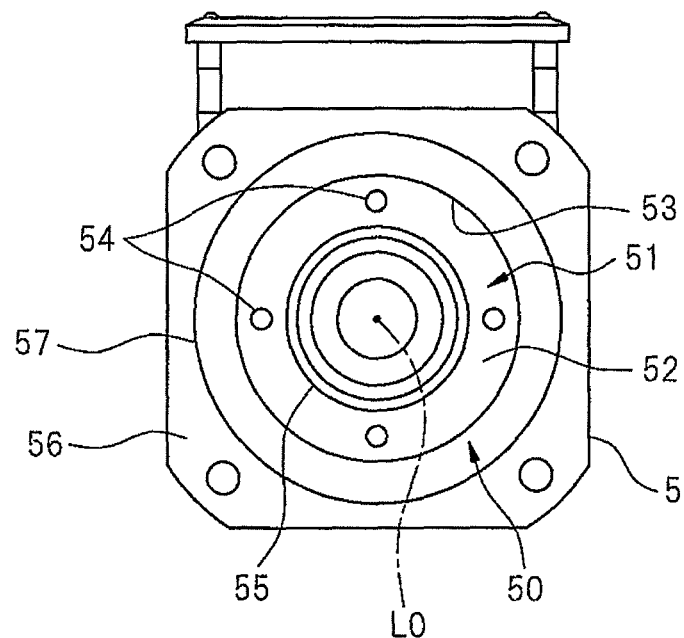
FIG. 3 is a view along an arrow mark III of FIG. 2.
Figure 4:
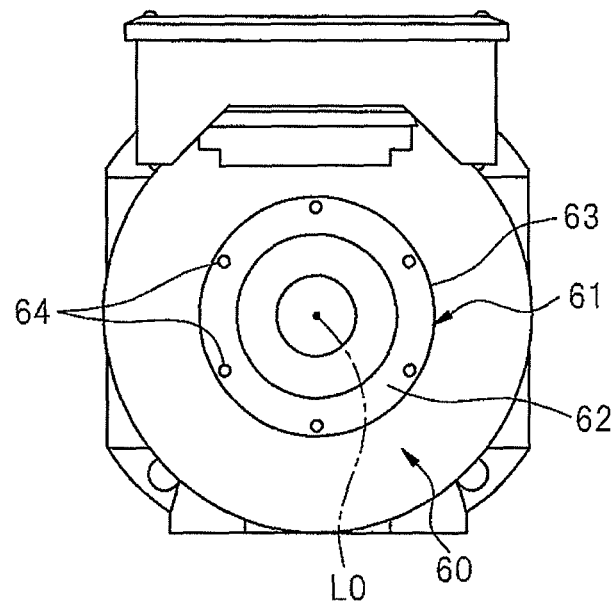
FIG. 4 is a view along an arrow mark IV of FIG. 2.

FIG. 2 is a side view of the electric motor 100 before the air purge devices 2, 3 are attached (partial cross-sectional view), FIG. 3 is a view along an arrow mark III of FIG. 2 (view seen from front), and FIG. 4 is a view along an arrow mark IV of FIG. 2 (view seen from rear). As shown in FIGS. 2 to 4, the electric motor body 1 has a stator core 4 and a rotor (not shown) which is arranged at the inside of the stator core 4 and is fastened to an output shaft 10. At an inner circumferential surface side of the stator core 4, a winding (not shown) is wound. The rotor rotates together with the output shaft 10 by the rotating magnetic field which is generated by current supplied to the winding.

At a front end face of the stator core 4, a front housing 5 is fastened by screws 4a, while at a rear end face of the stator core 4, a rear housing 6 is fastened by screws 4b. At a rear of the rear housing 6, a terminal box 7 in which power lines are laid for driving the electric motor is provided. The output shaft 10 is supported rotatably by bearings (not shown) arranged at the inside of the front housing 5 and bearings (not shown) which are arranged at the inside of the rear housing 6. Further, the front housing 5 is provided with a flange 56 and a circumferential surface 57 for attaching the electric motor body 1 to the machine tool.

A front end of the output shaft 10 passes through the front housing 5 and sticks out to the front from the front housing 5, while the rear end of the output shaft 10 passes through the rear housing 6 and sticks out to the rear from the rear housing 6. At the front of the output shaft 10, a labyrinth seal 8 is attached. At a front center part of the front housing 5, a step part 5a is formed corresponding to the labyrinth seal 8. Between the labyrinth seal 8 and the step part 5a, a clearance is formed equally in the peripheral direction. On the other hand, at the rear of the output shaft 10, a flinger 9 is attached. At the rear end center part of the rear housing 6, a step part 6a is formed corresponding to the flinger 9. A clearance is formed equally in the peripheral direction between the flinger 9 and the step part 6a. The labyrinth seal 8 and the flinger 9 are contactless type seal members for sealing the inside of the electric motor body 1. Instead of the labyrinth seal 8 and the flinger 9, an oil seal or other seal member can be used.

In this regard, in recent years, in machine tools, water soluble cutting fluids are mainly used from the viewpoint of improvement of the working performance and improvement of the working efficiency. However, among water soluble cutting fluids, there are ones with a high permeability. When using such a cutting fluid, the cutting fluid is liable to pass over the labyrinth seal 8 and flinger 9, and enter from the clearance between the output shaft 10 and the housings 5, 6 to the inside of the electric motor body 1. If cutting fluid enters inside of the electric motor body 1, poor insulation of the wiring or other trouble is liable to be caused, so entry of cutting fluid has to be avoided.

Therefore, in the present embodiment, as explained below, the air purge devices 2, 3 are attached to the electric motor body 1 so as to prevent the entry of cutting fluid into the electric motor body 1. Furthermore, in the present embodiment, the mounting parts of the air purge devices 2, 3 are constituted so that the air purge devices 2, 3 can be easily attached to the front housing 5 and the rear housing 6.

As shown in FIGS. 2 and 3, at a front end face 50 of the front housing 5, a circular recessed part 51 which is recessed to the rear is provided. A bottom surface 52 of the recessed part 51 is vertical with respect to the axial line L0. At a peripheral surface 53 of the recessed part 51, a cylindrical surface is formed about the axial line L0. The bottom surface 52 is provided with a plurality of (four) screw holes 54 in the peripheral direction. Furthermore, a ring-shaped groove 55 is provided at the inside diameter side of the screw holes 54.

As shown in FIGS. 2 and 4, at a rear end face 60 of the rear housing 6, a circular projecting part 61 swollen to the rear is provided. An end face 62 of the projecting part 61 is vertical to the axial line L0. At a peripheral surface 63 of the projecting part 61, a cylindrical surface is formed about the axial line L0. At the end face 62, a plurality of (six) screw holes 64 are provided in the peripheral direction.

Figure 5:
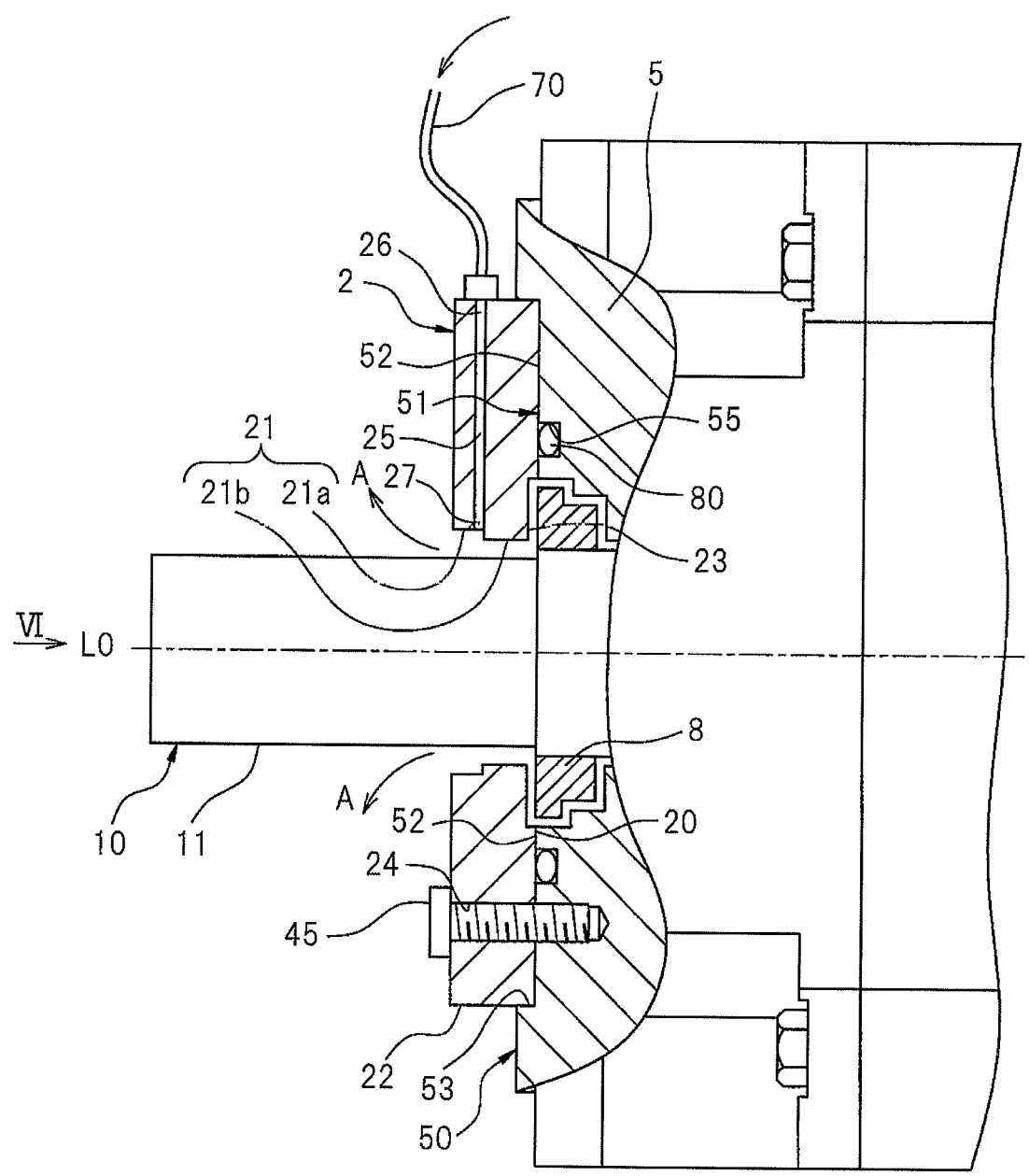
FIG. 5 is an enlarged view of principal parts of FIG. 1 which shows a configuration of a front side air purge device.
Figure 6:
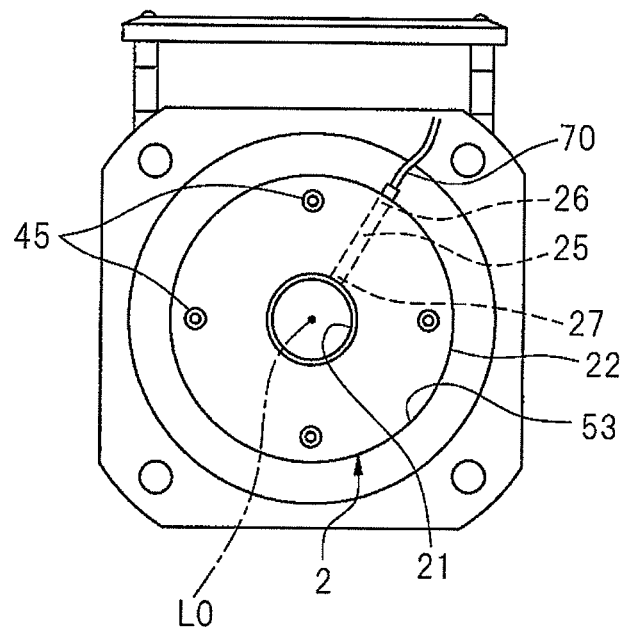
FIG. 6 is a view along an arrow mark VI of FIG. 5.

FIG. 5 is an enlarged view of principal parts of FIG. 1 which shows the configuration of the front side air purge device 2, while FIG. 6 is a view along an arrow mark VI of FIG. 5 (view seen from front). As shown in FIGS. 5 and 6, the air purge device 2 is configured by a flat plate of a predetermined thickness which is formed into a ring shape. A rear end face 20 of the air purge device 2 is formed vertical to the axial line L0. At an inner circumferential surface 21 of the air purge device 2, a cylindrical surface is formed about the axial line L0. At an outer circumferential surface 22, a cylindrical surface is formed about the axial line L0. The outer circumferential surface 22 of the air purge device 2 is fitted into the recessed part 51 of the front housing 5, whereby the rear end face 20 abuts against the bottom surface 52 of the recessed part 51 of the front housing 5. To the groove 55 of the bottom surface 52 of the front housing 5, an O-ring 80 is attached, whereby the abutting faces of the front housing 5 and the air purge device 2 in the axial direction are sealed.

At the air purge device 2, through holes 24 are formed in the axial direction at positions corresponding to the screw holes 54 of the front housing 5. At the screw holes 54, screws 45 which pass through the through holes 24 are screwed. Due to this, the air purge device 2 is fastened on the front housing 5. At the rear end face 20 of the front housing 5, a recessed part 23 is formed at the inside diameter side so as to prevent interference with the labyrinth seal 8.

In the present embodiment, at the outer circumferential surface 22 of the air purge device 2 and the peripheral surface 53 of the recessed part 51 of the front housing 5, cylindrical surfaces are formed, so the air purge device 2 can be positioned and fitted into the front housing 5. As a result, the clearance between the inner circumferential surface 21 of the air purge device 2 and the outer circumferential surface 11 of the output shaft 10 can be set uniformly in the peripheral direction. In this case, the diameters and fit tolerance of the cylindrical surfaces 22, 53 are suitably set while considering the working error, the assembly ability, etc. Further, in the present embodiment, the rear end face 20 of the air purge device 2 and the bottom surface 52 of the recessed part 51 of the front housing 5 are both formed vertical to the axial line L0, so the surfaces 20, 52 become parallel with each other. Therefore, the rear end face 20 can uniformly planarly contacts the bottom surface 52 of the recessed part 51 and the air purge device 2 can be attached with a good posture without causing tilting with respect to the front housing 5.

The plate thickness (axial direction length) of the air purge device 2 is larger than a depth of the recessed part 51 (axial direction length). The front end of the air purge device 2 protrudes from the front end face 50 of the front housing 5 to the front. In this protruding part, a through hole 25 is provided passing through the air purge device 2 from the outer circumferential surface 22 to the inner circumferential surface 21 in the diametrical direction.

Figure 7:
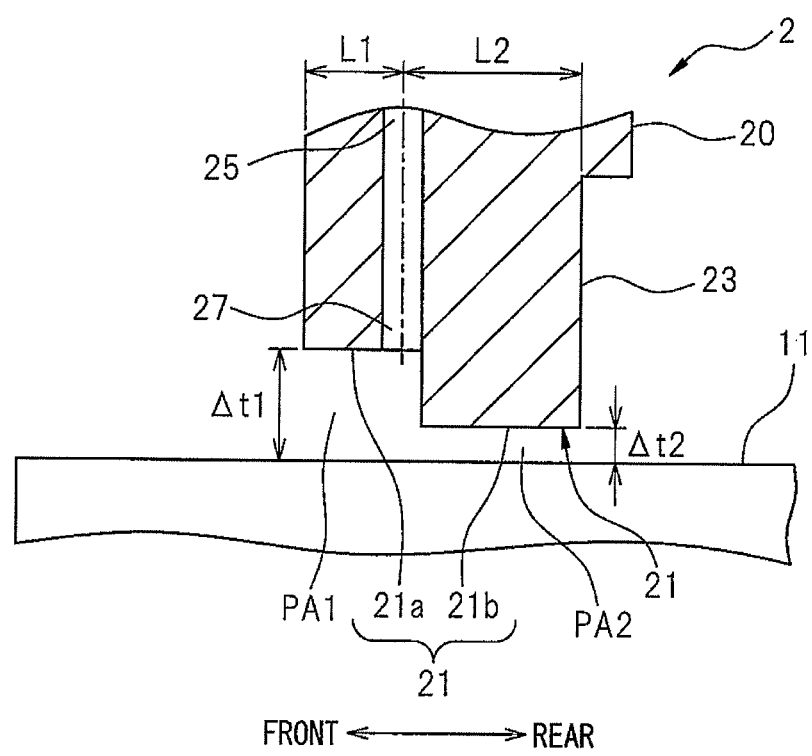
FIG. 7 is an enlarged view which shows a configuration of an inner circumferential surface of the air purge device of FIG. 5.

One end of the through hole 25 at the outer circumferential surface side of the air purge device 2 forms the inflow port 26 of the compressed air. At the inflow port 26, a tube 70 is attached to supply compressed air from the outside. The through hole 25 forms part of the flow path of the compressed air. The other end of the through hole 25 at the inner circumferential surface side of the air purge device 2 forms the outflow port 27 of the compressed air. FIG. 7 is an enlarged view which shows the configuration of the inner circumferential surface of the air purge device 2. As shown in FIG. 7, the outflow port 27 is provided in the front from the intermediate position in the axial direction of the inner circumferential surface 21 of the air purge device 2. Therefore, the distance L1 from the outflow port 27 to the front end face at the inner circumferential surface 21 of the air purge device 2 is shorter than the distance L2 to the rear end face.

The inner circumferential surface 21 is enlarged in diameter in a step manner to the front in the axial direction. The clearance $\Delta t1$ between inner circumferential surface 21a of the front side and the outer circumferential surface 11 of the output shaft 10 is larger than the clearance $\Delta t2$ between the rear side inner circumferential surface 21b and the outer circumferential surface 11. The clearances $\Delta t1$, $\Delta t2$ form passages PA1, PA2 through which air flowed out from the outflow port 27 flows. The front side passage PA1 is shorter than the rear side passage PA2 in axial direction length of the passage (L1<L2) and is longer in the diametrical direction length ($\Delta t1 > \Delta t2$). For this reason, the passage resistance of the front side passage PA1 is smaller than the passage resistance of the rear side passage PA2. In FIG. 7, although the outflow port 27 opens at the large diameter inner circumferential surface 21a, it may also open at the small diameter inner circumferential surface 21b and may also open so as to straddle the inner circumferential surface 21a and the inner circumferential surface 21b.

Figure 8:
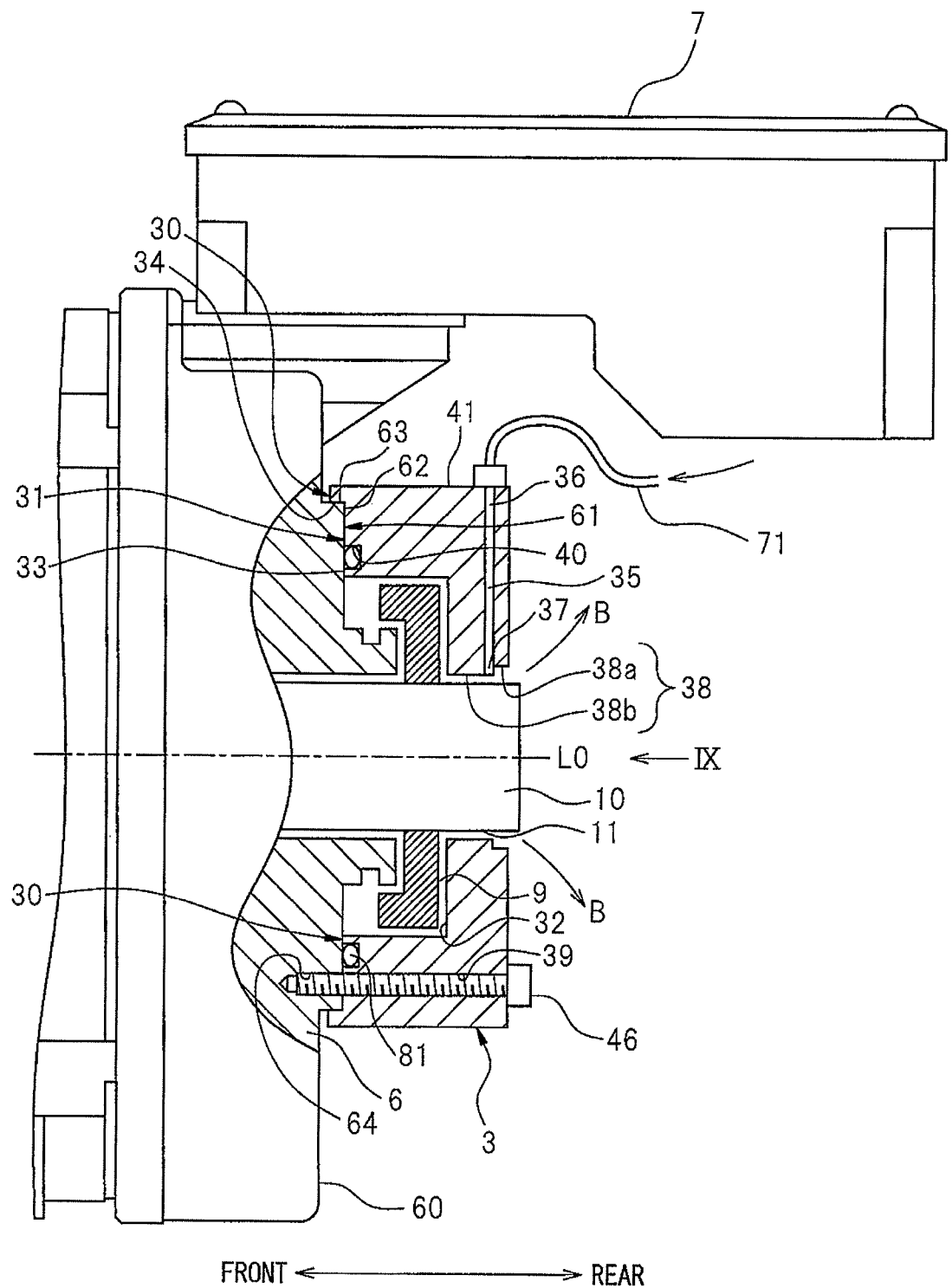
FIG. 8 is an enlarged view of principal parts of FIG. 1 which shows a configuration of a rear side air purge device.
Figure 9:
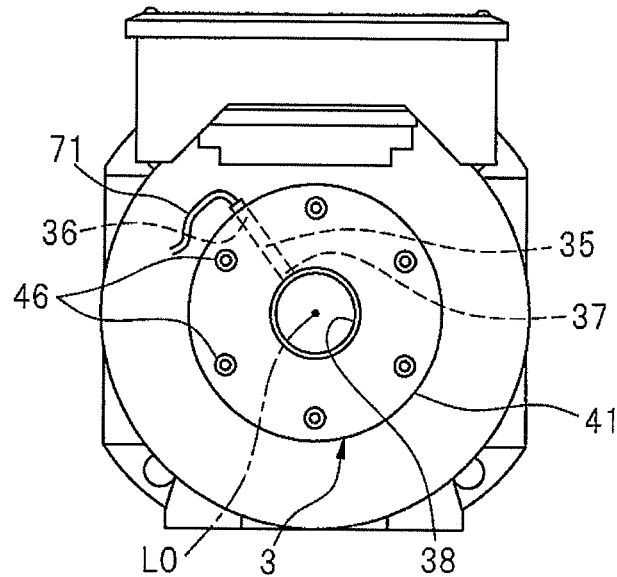
FIG. 9 is a view along an arrow mark IX of FIG. 8.

FIG. 8 is an enlarged view of principal parts of FIG. 1 showing the configuration of the rear side air purge device 3, while FIG. 9 is a view along the arrow IX of FIG. 8 (view seen from rear). As shown in FIGS. 8, 9, the air purge device 3 is comprised of a flat plate of a predetermined thickness formed in a ring shape and at the front end face 30 of which a stepped recessed part is provided. That is, on the front end face of the air purge device 3, a circular recessed part 31 is provided about the axial line L0. Furthermore, at the center of the recessed part 31, a circular recessed part 32 is provided about the axial line L0.

A bottom surface 33 of the front side recessed part 31 is vertical to the axial line L0. At a peripheral surface 34 of the recessed part 31, a cylindrical surface is formed about the axial line L0. The recessed part 31 fits with the projecting part 61 of the rear housing 6, and the bottom surface 33 abuts against the end face 62 of the projecting part 61. On the other hand, the rear side recessed part 32 is provided to avoid interference between the air purge device 3 and the flinger 9. Inside of the recessed part 32, the flinger 9 is arranged with a clearance from the air purge device 3. At the inner circumferential surface 38 of the air purge device 2 at the rear of the recessed part 32, a cylindrical surface is formed about the axial line L0.

At the air purge device 3, at the outside diameter side part of the recessed part 31, through holes 39 are formed in the axial direction at positions corresponding to the screw holes 64 of the rear housing 6. In the screw holes 64, screws 46 which run through the through holes 39 are screwed. Due to this, the air purge device 3 is fastened to the rear housing 6. At the bottom surface 33 of the recessed part 31, a ring-shaped groove 40 is provided at the inside diameter side from the through holes 39, an O-ring 81 is attached to the groove 40, and abutting surfaces of the rear housing 6 and the air purge device 3 in the axial direction are sealed.

In the present embodiment, the circumferential surface 34 of the recessed part 31 of the air purge device 3 and the outer circumferential surface 63 of the projecting part 61 of the rear housing 6 are formed with cylindrical surfaces, so the air purge device 3 can be positioned and fitted into the rear housing 6. As a result, the clearance between the inner circumferential surface 38 of the air purge device 3 and the outer circumferential surface 11 of the output shaft 10 can be set uniformly in the peripheral direction. In this case, the diameters and fit tolerances of the cylindrical surfaces 34, 63 are suitably set while considering the working error, the assembly ability, etc. Further, in the present embodiment, both the bottom surface 33 of the recessed part 31 of the air purge device 3 and the end face 62 of the projecting part 61 of the rear housing 6 are formed vertical to the axial line L0, so the surfaces 33, 62 become parallel with each other. Therefore, the bottom surface 33 can uniformly planarly contact the end face 62 of the projecting part 61 and the air purge device 3 can be attached to the rear housing 6 with a good posture without a slant.

Figure 10:
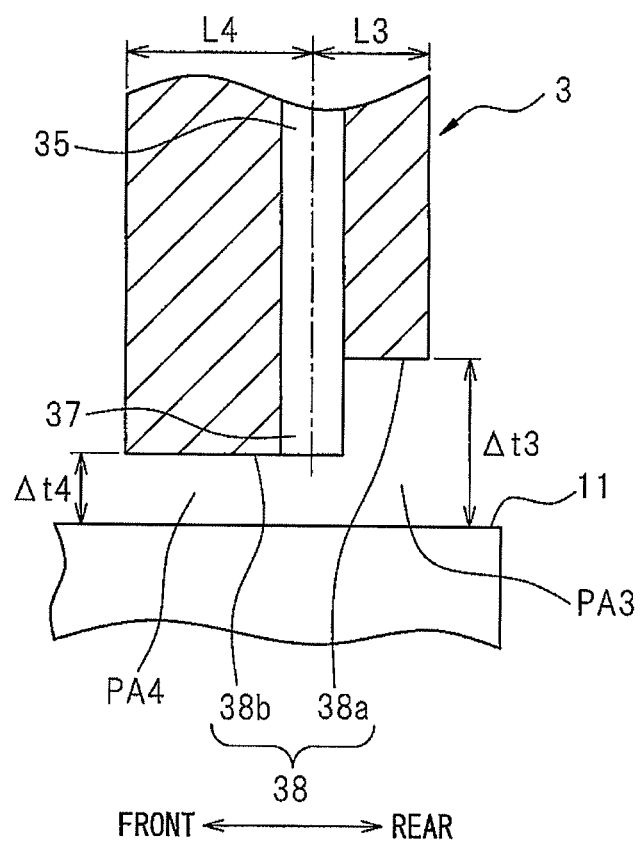
FIG. 10 is an enlarged view which shows a configuration of an inner circumferential surface of the air purge device of FIG. 8.

The air purge device 3 is provided at the rear of the recessed part 32 with a through hole 35 which runs from the outer circumferential surface 41 to the inner circumferential surface 38 passing through the air purge device 3 in the diametrical direction. One end of the through hole 35 at the outer circumferential Surface side of the air purge device 3 forms an inflow port 36 of the compressed air. At the inflow port 36, a tube 71 is attached to supply compressed air from the outside. The through hole 35 forms the flow path of the compressed air. The other end of the through hole 35 at the inner circumferential surface side of the air purge device 3 forms the outflow port 37 of the compressed air. FIG. 10 is an enlarged view which shows the configuration of the inner circumferential surface of the air purge device 3. As shown in FIG. 10, the outflow port 37 is provided at the rear from the intermediate position of the inner circumferential surface 38 of the air purge device 3 in the axial direction. Therefore, the distance L3 from the outflow port 37 to the rear end face at the inner circumferential surface 38 of the air purge device 3 is shorter than the distance L4 to the front end face.

The inner circumferential surface 38 is enlarged in diameter in a step manner toward the rear in the axial direction. The clearance Δt3 between the rear side inner circumferential surface 38a and the outer circumferential surface 11 of the output shaft 10 is larger than the clearance Δt4 between the front side inner circumferential surface 38b and the outer circumferential surface 11. The clearances Δt3, Δt4 form the passages PA3, PA4 through which the air flowed out from the outflow port 37 flows. The rear side passage PA3 is shorter in axial direction length of the passage than the front side passage PA4 (L3<L4) and is longer in diametrical direction length (Δt3>Δt4). For this reason, the passage resistance of the rear side passage PA3 is smaller than the passage resistance of the front side passage PA4. In FIG. 10, although the outflow port 37 opens to the small diameter inner circumferential surface 38b, it may also open to the large diameter inner circumferential surface 38a and may also open so as to straddle the inner circumferential surface 38a and the inner circumferential surface 38b.

Next, the main operation of the electric motor according to the present embodiment will be explained. When using the electric motor 100 in a state in which the cutting fluid splatters, the air purge devices 2, 3 are attached to the electric motor body 1. That is, the air purge device 2 is fitted into the recessed part 51 of the front end face 50 of the front housing 5 and is fastened by the screws 45. The air purge device 3 is fitted into the projecting part 61 of the rear end face 60 of the rear housing 6 and is fastened by the screws 46. Since the air purge devices 2, 3 are fastened by the screws 45, 46, the air purge devices 2, 3 can be easily attached.

In this case, the air purge devices 2, 3 are positioned by the recessed part 51 and the projecting part 61, so the air purge devices 2, 3 can be precisely attached to the housings 5, 6. Further, the abutting faces of the air purge device 2 and the front housing 5 in the axial direction, that is, the rear end face 20 of the air purge device 2 and the bottom surface 52 of the recessed part 51 of the front housing 5, and the abutting faces of the air purge device 3 and the rear housing 6 in the axial direction, that is, the bottom surface 33 of the recessed part 31 of the air purge device 3 and the end face 62 of the projecting part 61 of the rear housing 6, are respectively vertical to the axial line L0. For this reason, when the screws 45, 46 are used to apply axial force, the surfaces uniformly planarly contact and the air purge devices 2, 3 can be fastened with a good posture to the electric motor body 1. Due to this, the clearance between the inner circumferential surfaces 21, 38 of the air purge devices 2, 3 and the output shaft 10 can be set uniformly in the peripheral direction.

At the time of use of the electric motor 100, compressed air is supplied through the tube 70 and inflow port 26 to the through hole 25 of the air purge device 2 and compressed air is supplied through the tube 71 and inflow port 36 to the through hole 35 of the air purge device 3.

The compressed air supplied to the through hole 25 of the front side air purge device 2 flows out from the outflow port 27 toward the outer circumferential surface 11 of the output shaft 10. In this case, the passage resistance of the front side passage PA1 of the outflow port 27 is smaller than the passage resistance of the rear side passage PA2. For this reason, the air flowed out from the outflow port 27 spreads to the outer circumference along the outer circumferential surface 11 while mainly flowing to the front and, as shown in FIG. 5 by the arrow mark A, is blown out from the front end face side of the air purge device 2. Due to this, cutting fluid around the rotary shaft 10 is removed and entry of cutting fluid into the front housing 5 can be prevented. Further, the mounting surface of the air purge device 2 (rear end face 20) is sealed by the O-ring 80, so leakage of the compressed air flowing along the mounting surface to the outside can be prevented.

On the other hand, the compressed air which is supplied to the through hole 35 of the rear side air purge device 3 flows out from the outflow port 37 toward the outer circumferential surface 11 of the output shaft 10. In this case, the passage resistance of the rear side passage PA3 of the outflow port 37 is smaller than the passage resistance of the front side passage PA4. For this reason, the air flowed out from the outflow port 37 spreads to the entire circumference along the outer circumferential surface 11 while mainly flowing to the rear and, as shown in FIG. 8 by the arrow mark A, is blown out from the rear end face side of the air purge device 3. Due to this, cutting fluid around the rotary shaft 10 is removed and entry of cutting fluid to the inside of the rear housing 6 can be prevented. Further, the mounting surface of the air purge device 3 (recessed part bottom surface 33) is sealed by an O-ring 81, so leakage of compressed air to the outside along the mounting surface can be prevented.

When using the electric motor 100 in an environment other than a machine tool etc. where the cutting fluid etc. is not liable to enter it, the air purge function is not necessary. In this case, if leaving the air purge devices 2, 3 attached, the electric motor 100 becomes larger in size and heavier in weight, so the air purge devices 2, 3 are detached from the electric motor body 1. The air purge devices 2, 3 can be detached by loosening the screws 45, 46. For this reason, it is possible to easily detach the air purge devices 2, 3 and possible to easily change the specifications of the electric motor 100

According to the present embodiment, the following function effects can be exhibited.

(1) The front end face 50 of the front housing 5 is provided with the recessed part 51, the outer circumferential surface 22 of the air purge device 2 is fit into the recessed part 51, the rear end face 60 of the rear housing 6 is provided with the projecting part 61, the recessed part 31 of the air purge device 3 is fit into the projecting part 61, and the air purge devices 2, 3 are fastened by screws 45, 46 to the housings 5, 6. Due to this, the air purge devices 2, 3 can be easily and precisely attached to the housings 5, 6 and, further, the air purge devices 2, 3 can be easily detached from the housings 5, 6. Therefore, it is possible to easily change the electric motor 100 in specifications to specifications tailored for situations in which an air purge function is necessary and situations in which it is not necessary.

(2) The air purge devices 2, 3 are fastened by screws 45, 46 to the housings 5, 6, so the air purge devices 2, 3 can be easily attached and detached. Further, the air purge devices 2, 3 can be fastened strongly to the housings 5, 6.

(3) The circumferential surface 53 of the recessed part 51 of the front housing 5 and the outer circumferential surface 22 of the air purge device 2 fitting to each other are respectively formed as cylindrical surfaces about the axial line L0, and the outer circumferential surface 63 of the projecting part 61 of the rear housing 6 and the circumferential surface 34 of the recessed part 31 of the air purge device 3 fitting to each other are respectively formed as cylindrical surfaces about the axial line L0. Due to this, while the configuration is simple, the air purge devices 2, 3 are improved in mounting precision and it is possible to set the clearances between the inner circumferential surfaces 21, 38 of the air purge devices 2, 3 and the output shaft 10 uniformly in the peripheral direction.

(4) The front end face 20 of the air purge device 2 and bottom surface 52 of the recessed part 51 of the front housing 5 abutting against each other and bottom surface 33 of the recessed part 31 of the air purge device 3 and end face 62 of the projecting part 61 of the rear housing 6 abutting against each other are respectively formed vertical to the axial line L0. Due to this, it is possible to mount the air purge devices 2, 3 with good postures and possible to set the clearances between the inner circumferential surfaces 21, 38 of the air purge devices 2, 3 and the output shaft 10 with a good precision.

(5) At the axial direction abutting faces of the air purge device 2 and the front housing 5 and the axial direction abutting faces of the air purge device 3 and the rear housing 6, O-rings 80, 81 are interposed. Due to this, it is possible to prevent the compressed air flowed out from the inner circumferential surfaces 21, 38 of the air purge devices 2, 3 from leaking by passing between the air purge devices 2, 3 and the housings 5, 6 and it is possible to prevent wasteful discharge of the compressed air supplied to the air purge devices 2, 3.

(6) The through holes 25, 35 are opened from the outer circumferential surfaces 22, 41 to the inner circumferential surfaces 21, 38 of the air purge devices 2, 3, and inflow ports 26, 36 and outflow ports 27, 37 of the compressed air are formed at opposite sides of the through holes 25, 35. Due to this, the compressed air is blown out toward the outer circumferential surface 11 of the output shaft 10, and it is possible to prevent the entry of cutting fluid from the axial direction ends to the insides of the housings 5, 6.

(7) The outflow ports 27, 37 of the air purge devices 2, 3 are arranged at the axial end side of the output shaft 10 from intermediate positions of the inner circumferential surfaces 21, 38 in the axial directions (L1<L2, L3<L4), so compressed air flowed out from the outflow ports 27, 37 easily flows toward the axial end side (opposite side of electric motor body 1) and cutting fluid around the output shaft 11 can be removed well.

(8) The clearances between the inner circumferential surfaces 21, 38 of the air purge devices 2, 3 and the output shaft 10 are configured to become larger at the axial end side of the output shaft 10 than the housing 5, 6 sides (Δt1>Δt2, Δt3>Δt4), so the compressed air flowed out from the outflow ports 27, 37 flows more easily toward the outside in the axial direction and entry of cutting fluid to the insides of the housings 5, 6 can be reliably prevented.

(Modifications)

In the above embodiment, the front end face 50 of the front housing 5 is provided with the recessed part 51, the outer circumferential surface 22 of the air purge device 2 is fitted into the recessed part 51, and the rear end face 20 (mounting surface) is attached to the front end face 50. However, the rear end face 20 of the air purge device 2 may also be provided with a projecting part and the projecting part may be fitted into the recessed part 51. The rear end face 20 of the air purge device 2 may also be provided with a recessed part, the front end face 50 of the front housing 5 may be provided with a projecting part, and the recessed part and the projecting part may be fitted. Further, in the above embodiment, the rear end face 60 of the rear housing 6 is provided with the projecting part 61, the front end face 30 (mounting surface) of the air purge device 3 is provided with the recessed part 31, and the recessed part 31 is fitted into the projecting part 61 to attach the bottom surface 33 to the rear end face 60. However, the front end face 30 of the air purge device 3 may also be provided with a projecting part, the rear end face 60 of the rear housing 6 may be provided with a recessed part, and the projecting part and the recessed part may be fitted. That is, so long as configured so that the end faces of the housings 5, 6 and the mounting surfaces of the air purge devices 2, 3 fit to each other, the configuration of the fitting parts is not limited to the ones explained above. Therefore, the configurations of the cylindrically shaped fitting surfaces (circumferential surfaces 22, 53, circumferential surfaces 34, 63) which fit with each other and abutting faces (end faces 20, 52, end faces 33, 62) which abut against each other in the axial direction are not limited to the above.

In the above embodiment, although the air purge devices 2, 3 are attached to the front and rear sides of the electric motor body 1, it is also possible to attach only one of the air purge devices 2, 3 to the housing. Although the output shaft 10 is provided with a labyrinth seal 8 and a flinger 9, these may also be omitted. Instead of the O-rings 80, 81, other seal members may also be used. The seal members may also be omitted. In the above embodiment, although the air purge devices 2, 3 are fastened by screws 45, 46 to the end faces 50, 60 of the housings 5, 6, it is also possible to use other fastening parts which can attach and detach the air purge devices 2, 3.

In the above embodiment, the air purge devices 2, 3 are provided with through holes 25, 36 from the outer circumferential surfaces 22, 41 to the inner circumferential surfaces 21, 38 and are formed with flow paths which connect the inflow ports 26, 36 and the outflow ports 27, 37 of the compressed air. However, the configurations of an inflow part and outflow part of the compressed air and the configuration of a flow path forming part are not limited to these. For example, the air purge devices 2, 3 may be provided with grooves at their end faces and the grooves may be used to form the flow paths. At the inner circumferential surface 21 or 38, one outflow ports 27 or 37 is provided. However, if fluctuations occur in the peripheral direction in the flow of compressed air at the passages PA1, PA3, a plurality of outflow parts may also be provided in the peripheral direction. In this case, it is also possible to provide a plurality of inflow parts corresponding to the outflow parts and possible to form a flow path so that the compressed air from an inflow part is divided to a plurality of outflow parts.

In the above embodiment, the outflow ports 27, 37 of the air purge devices 2, 3 are arranged at the axial end side of the output shaft 10 from the intermediate positions of the inner circumferential surfaces 21, 38 in the axial direction, that is, the opposite sides of the housings 5, 6, and the clearances $\Delta t2$, $\Delta t4$ between the inner circumferential surfaces 21, 38 and the outer circumferential surface 11 of the output shaft 10 at the housing 5, 6 sides from the outflow ports 27, 37 (mounting surface sides of the air purge devices 2, 3) are smaller than the clearances $\Delta t1$, $\Delta t3$ at the axial end sides from the outflow port 27, 37 (opposite sides of mounting surfaces of air purge devices 2, 3). However, the configuration of the air purge devices 2, 3 is not limited to these. For example, the outflow part of the compressed air can also be provided tilted with respect to the axial end side. To enable the passage loss of the passages PA2, PA4 at the housing 5, 6 sides to become larger, other resistances may also be provided at the passages PA2, PA4.

Although the electric motor 100 of the above embodiment is applied to a machine tool, the electric motor 100 of the present invention can similarly be applied to something other than a machine tool. It also has the effect of preventing the entry of not only cutting fluid, but also dust or other foreign matter.

It is possible to freely combine the above embodiment and one or more of the modifications.

According to the present invention, the housing and the air purge device fit to each other whereby the air purge device is fastened to the end face of the housing in a detachable manner, so it is possible to easily change the electric motor in specifications to specifications tailored to situations in which an air purge function is unnecessary and situations in which it is necessary.

While the present invention has been described with reference to the preferred embodiments thereof, it will be understood, by those skilled in the art, that various modifications and changes may be made thereto without departing from the scope of the appended claims.

The invention claimed is:

1. An electric motor, comprising:
   a stator core;
   a housing fastened at an end of the stator core;
   an output shaft stuck out from an end face of the housing at an opposite end of the stator core;
   an air purge device having an inner circumferential surface and a mounting surface, the inner circumferential surface surrounding an outer circumferential surface of the output shaft, the mounting surface being mounted on the end face of the housing at the opposite end of the stator core, the air purge device being configured to supply air to a clearance between the inner circumferential surface of the air purge device and the outer circumferential surface of the output shaft; and
   a fastening part fastening the air purge device to the end face of the housing in a detachable manner,
   wherein the housing and the air purge device respectively have fitting parts at which the housing and the air purge device are fitted to each other when mounting the air purge device to the end face of the housing.

2. The electric motor according to claim 1, wherein the fastening part includes screws.

3. The electric motor according to claim 1, wherein the respective fitting parts have fitting surfaces formed cylindrically about an axial line extending along a center of the output shaft.

4. The electric motor according to claim 3, wherein the respective fitting parts are vertical to the axial line and have abutting surfaces which abut against each other.

5. The electric motor according to claim 1, further comprising a seal member interposed between the housing and the air purge device.

6. The electric motor according to claim 1,
   wherein the air purge device has an inflow part into which compressed air flows, an outflow part out of which the compressed air flows, and a flow path forming part which forms a flow path connecting the inflow part and the outflow part, and
   wherein the outflow part is provided at the inner circumferential surface of the air purge device.

7. The electric motor according to claim 6, wherein the outflow part is arranged at an axial end side of the output shaft from an intermediate position in an axial direction of the inner circumferential surface of the air purge device.

8. The electric motor according to claim 6, wherein the clearance between the inner circumferential surface of the air purge device and the outer circumferential surface of the output shaft at a side of the mounting surface from the outflow part is smaller than the clearance between the inner circumferential surface of the air purge device and the outer circumferential surface of the output shaft at an opposite side of the mounting surface from the outflow part.

9. The electric motor according to claim 1, wherein the housing defines a recessed part therein and an outer circumferential surface of the air purge device is fitted within the recessed part of the housing to form the respective fitting parts.

10. The electric motor according to claim 1, wherein the air purge device defines a recessed part on the mounting surface, the housing defines a projecting part, and an outer circumferential surface of the projecting part is fitted within the recessed part of the air purge device to form the respective fitting parts.

* * * * *